S. OUIMET.
FILTRATION SYSTEM.
APPLICATION FILED FEB. 25, 1910.

975,450. Patented Nov. 15, 1910.

Witnesses.
H. Davis
P. Shee.

Inventor.
Séraphin Ouimet
By
Atty

UNITED STATES PATENT OFFICE.

SÉRAPHIN OUIMET, OF MONTREAL, QUEBEC, CANADA.

FILTRATION SYSTEM.

975,450.  Specification of Letters Patent.  Patented Nov. 15, 1910.

Application filed February 25, 1910. Serial No. 545,999.

*To all whom it may concern:*

Be it known that I, SÉRAPHIN OUIMET, resident of 15 St. Lawrence Boulevard, in the city and district of Montreal, in the Province of Quebec, in the Dominion of Canada, a subject of the King of Great Britain, have invented certain new and useful Improvements in Filtration Systems; and I do hereby declare that the following is a full, clear, and exact description of the same.

The invention relates to improvements in filtration systems, as described in the present specification and illustrated in the accompanying drawings that form part of the same.

The invention consists essentially in the novel construction and arrangement whereby the water in a river or lake is made to find its level in an inclosed basin through a plurality of filter beds contained in separated chambers surrounding said basin.

The objects of the invention are to provide a filter for towns and cities having a body of water suitably situated in relation thereto, to devise a means of filtering the water which will be automatic in operation and thoroughly effective as regards filtration, and generally to furnish a structure that may be used for large cities as well as for smaller places.

Figure 1:
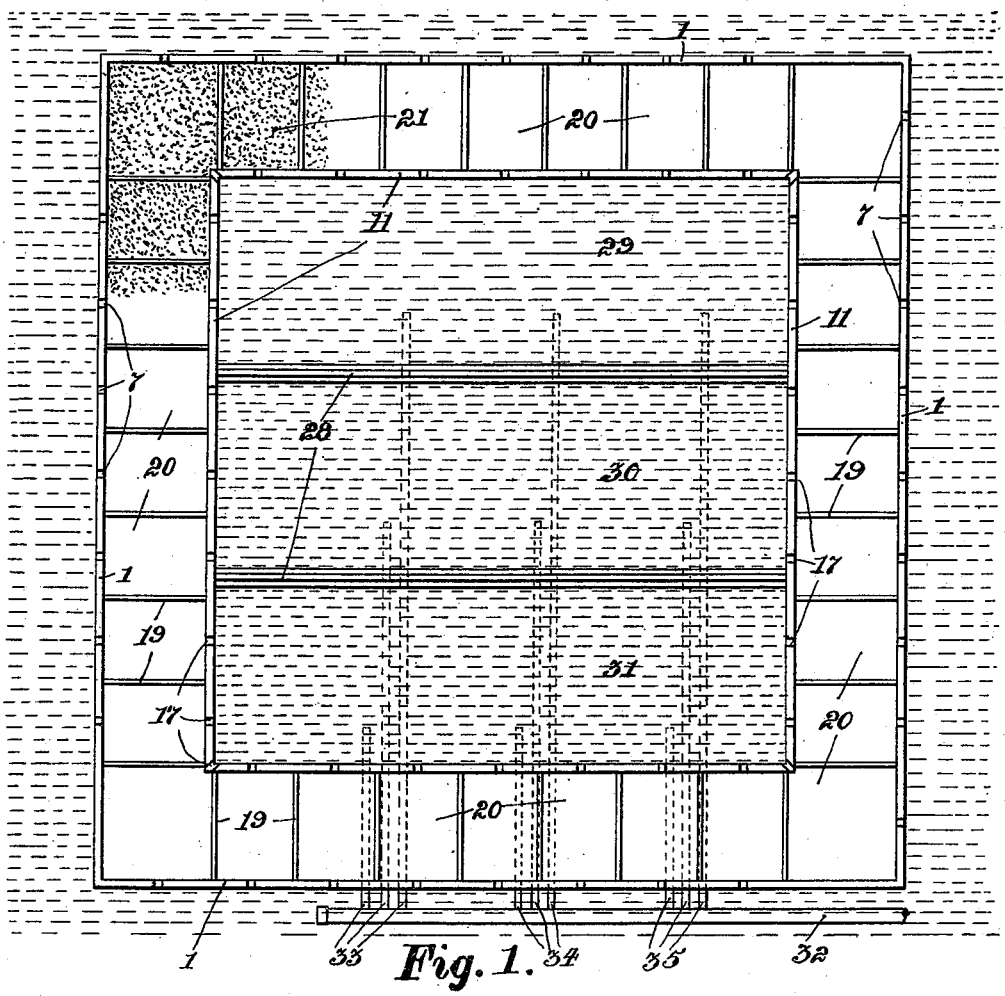
Figure 2:
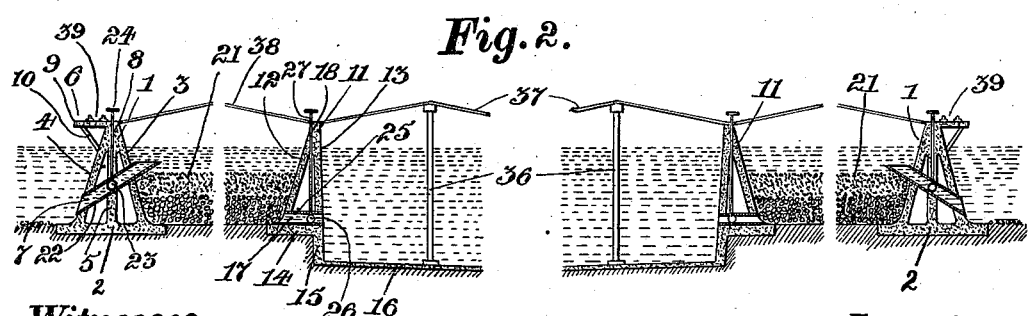

In the drawings, Figure 1 is a diagrammatic view of the structure showing the surrounding water, the water in the basin, and a view of the filter beds complete. Fig. 2 is a cross sectional view showing filter beds and the filter basin broken away centrally.

Like numerals of reference indicate corresponding parts in each figure.

Referring to the drawings, 1 is a concrete outer wall finding its foundation 2 in the bed of the river or lake, said concrete wall being here shown as formed with the inner and outer sides 3 and 4 respectively, and the central portion 5 extending from said foundation 2 and converging from said foundation to the top 6. 7 are passages preferably extending in an upward incline from the lower portion of the outer sides 4 through said wall to a point intermediate of the height of the inner side 3.

8 are rod holes preferably through the central portion 5 extending from the top downwardly into the passages 7.

9 is a platform extending outwardly from the top 6 of the wall 1 and suitably braced by the strut formation or formations 10.

The concrete wall incloses a large space in the body of water, the upper part of said wall being above the level of the water while the lower part is submerged. The inclosure here is shown as rectangular, though it must be understood that it may be of any desired shape.

11 is the inner concrete wall formed of the inner and outer sides 12 and 13 extending upwardly from the foundation 14, said foundation being suitably placed in the bed of the body of water and having the downwardly extending inner end 15 terminating and preferably forming part with the concrete bed 16 of the filter basin.

17 are passages through the wall 11 at the lower end thereof immediately above the foundation.

18 are vertical rod holes leading in the direction of the passages 17.

It will now be seen that there is a double wall, that is to say, an inner and an outer wall, with a considerable space between them, and passages leading through the outer wall into the space between said walls and passages leading from the space between said walls into the filter basin inclosed within the inner wall.

19 are concrete walls extending across the space between the wall 1 and the wall 11 and dividing said space into a plurality of chambers 20, said chambers being preferably entirely independent one of the other and each having an inlet passage 7 and an outlet passage 17 or a plurality of said passages as may be desired.

21 is a suitable filtering substance, such as gravel or any well known material used for the purpose, said substance forming beds in each of the chambers 20 immediately below the entrance of the inlet passages 7 to the chambers 20.

22 are inlet pipes introduced into the passages 7 and extending above the level of the filter beds into each of the chambers 20, so that the water in finding its level will flow through said inlet pipes and empty over the filtering substance in each of said chambers 20. 23 are valves introduced into the pipes 22 and operated from the top 6 of the wall 1 by means of the rods 24 connected to said valves 23 through the rod holes 8.

25 are outlet pipes introduced in the passages 17 for the flow of water passing through said filtering substances into the filter basin. 26 are valves introduced in the outlet pipes 25 and operated from the top of the inner wall 11 by the rods 27 connected to said valves 26 through the rod holes 18.

28 are partitioning concrete walls extending across the filter basin inclosed within the inner wall 11 and dividing said filter basin into the compartments 29, 30 and 31 or as many more compartments as may be required according to the number of walls extending thereacross.

32 is the main supply pipe having the intake branches therefrom 33, 34 and 35 extending into the compartments respectively of the filter basin, said supply pipe leading to the city or town as customary.

36 are pillars extending upwardly from the bed of the filter basin. 37 is a roof extending from side to side of the inner wall and suitably supported by said pillars 36 and said inner walls.

38 is a roof extending over the chambers 20 from inner wall to outer wall.

39 is a rail way on which any kind of cars may be operated for delivering gravel or other filtering substances to the chambers 20.

The operation of this filtering system need not be explained at length as it is obvious that where walls are submerged, if passages lead through said walls, the water will find its way to its own level, and as the inlet passages through the outer wall are much below the level of the water, said water will flow through said inlet passages into the chambers 20 and from there trickle through said substance and flow through the outlet passages into the various compartments of the filter basin from where the water will flow through the intake pipes to the main pipes and so on to the city or town.

It will be noticed that any one of the chambers may be closed up and cleaned out, the same way any one of the compartments of the filter basin may be emptied and thoroughly cleansed, in fact one of the salient features of the invention is the means in the arrangement for thoroughly cleansing the several parts.

The operation of the inlets and outlets is very simple and either an outlet or outlets or an inlet or inlets may be closed together or separately, as the case may be. Further, the water is always sure to be properly filtered and no other water can reach the city or town, while the pipes and the filter are kept in proper condition, and the upkeep of the system is very cheap, for after being constructed there is comparatively little expense attached to running it, beyond the minimum attention to the filter beds and basin.

What I claim as my invention is:

1. In a filtration system, the combination with a surrounding body of water and a well or basin formed by an excavation in the bed of said body of water, of an outer concrete wall extending upwardly from the bed of said body of water above the surface level and having a plurality of ingress openings therethrough below the said surface level suitable spaced, a plurality of concrete walls extending laterally and inwardly from said outer wall to the edge of said well or basin between ingress openings, an inner concrete wall extending upwardly from the bed of said well or basin to the level of said outer wall and joined to the inner ends of the lateral walls and having egress openings from filter chambers formed by the outer, lateral and inner walls, said chambers being all on the same level and having the bed of the body of water as their bottoms, and filtering substance contained in said chambers.

2. In a filtering system, the combination with a surrounding body of water and a well or basin formed by an excavation in the bed of said body of water, of an outer concrete wall extending upwardly from the bed of said body of water above the surface level and having a plurality of ingress openings therethrough below the said surface level suitably spaced, a plurality of concrete walls extending laterally and inwardly from said outer wall to the edge of said well or basin between ingress openings, an inner concrete wall extending upwardly from the bed of said well or basin to the level of said outer wall and joined to the inner ends of the lateral walls and having egress openings from filter chambers formed by the outer, lateral and inner walls, said chambers being all on the same level and having the bed of the body of water as their bottoms, filtering substance contained in said chambers, valves controlling the flow of water through said openings, operating rods extending downwardly through suitable rod holes in the walls, a roof covering over said chambers, and a roof covering over the central basin.

3. In a filtering system, the combination with a surrounding body of water and a well or basin formed by an excavation in the bed of said body of water, of an outer concrete wall extending upwardly from the bed of said body of water above the surface level and having a plurality of ingress openings therethrough below the said surface level suitably spaced, a plurality of concrete walls extending laterally and inwardly from said outer wall to the edge of said well or basin between ingress openings, an inner concrete wall extending upwardly from the bed of said well or basin to the level of said outer wall and joined to the inner ends of the lateral walls and having egress openings from filter chambers formed by the outer lateral and inner walls, said chambers being all on the same level and having the bed of the body of water as their bottoms, filtering substance contained in said chambers, valves controlling the flow of water through said openings, suitable roofing over said chambers and said basin, a main supply pipe, and branch supply pipes extending from said basin.

4. In a filtering system, the combination with a surrounding body of water and a well or basin formed by an excavation in the bed of said body of water, of an outer concrete wall extending upwardly from the bed of said body of water above the surface level and having a plurality of ingress openings therethrough below the said surface level suitably spaced, a plurality of concrete walls extending laterally and inwardly from said outer wall to the edge of said well or basin between ingress openings, an inner concrete wall extending upwardly from the bed of said well or basin to the level of said outer wall and joined to the inner ends of the lateral walls and having egress openings from filter chambers formed by the outer, lateral and inner walls, said chambers being all on the same level and having the bed of the body of water as their bottoms, filtering substance contained in said chambers, the aforesaid outer wall having a platform extending outwardly therefrom at the upper end, a railway extending completely around said platform, valves controlling the flow of water through said openings, suitable roofing over said chambers and basin, and supply pipes extending from said filter basin.

Signed at the city and district of Montreal, Quebec, Canada, this 17th. day of February, 1910.

SÉRAPHIN OUIMET.

Witnesses:
G. H. TRESIDDER,
P. SHEE.